US009888500B2

(12) United States Patent
Nguyenvan

(10) Patent No.: US 9,888,500 B2
(45) Date of Patent: Feb. 6, 2018

(54) WIRELESS COMMUNICATION DEVICE CAPABLE OF OPERATING AS MASTER STATION OF WIRELESS NETWORK

(71) Applicant: Brother Kogyo Kabushiki Kaisha, Nagoya-shi, Aichi-ken (JP)

(72) Inventor: Thanh Nguyenvan, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 76 days.

(21) Appl. No.: 14/606,769

(22) Filed: Jan. 27, 2015

(65) Prior Publication Data

US 2015/0215973 A1    Jul. 30, 2015

(30) Foreign Application Priority Data

Jan. 27, 2014  (JP) ................................. 2014-012494

(51) Int. Cl.
*H04W 76/02* (2009.01)
*H04W 60/00* (2009.01)
(Continued)

(52) U.S. Cl.
CPC ......... *H04W 76/02* (2013.01); *H04L 67/1044* (2013.01); *H04L 67/1048* (2013.01);
(Continued)

(58) Field of Classification Search
CPC ... H04W 76/02; H04W 60/00; H04W 76/064; H04W 76/066; H04W 84/047;
(Continued)

(56) References Cited

U.S. PATENT DOCUMENTS 6,829,487 B2 * 12/2004 Eiden .................... H04L 12/185
455/519
8,655,503 B2   2/2014  Ochi
(Continued)

FOREIGN PATENT DOCUMENTS

EP        2651179 A1    10/2013
JP     2001-326658 A    11/2001
(Continued)

OTHER PUBLICATIONS

Wi-Fi Alliance Technical Committee P2P Task Group, "Wi-Fi Peer-to-Peer (P2P) Technical Specification", Version 1.1, pp. 1-159.
(Continued)

*Primary Examiner* — Edan Orgad
*Assistant Examiner* — Ivan O Latorre
(74) *Attorney, Agent, or Firm* — Banner & Witcoff, Ltd.

(57) ABSTRACT

A wireless communication device may form a wireless network in which the wireless communication device operates as a master station, terminate a wireless connection with a target apparatus in a case where a wireless connection request is received from a specific external apparatus under a state of a number of slave apparatuses being equal to an upper limit number K, establish a wireless connection with the specific external apparatus, and perform a wireless communication of first target data with the specific external apparatus by using the wireless network. The wireless communication device may terminate the wireless connection with the specific external apparatus, and establish a wireless connection with the target apparatus via the first wireless communication interface, so as to cause the target apparatus to participate as the slave station in the wireless network again.

17 Claims, 9 Drawing Sheets

(51) Int. Cl.
   *H04L 29/08* (2006.01)
   *H04W 4/08* (2009.01)
   *H04W 76/06* (2009.01)
   *H04W 84/18* (2009.01)
   *H04W 84/20* (2009.01)
(52) U.S. Cl.
   CPC ............ *H04W 4/08* (2013.01); *H04W 60/00* (2013.01); *H04W 76/066* (2013.01); *H04W 84/18* (2013.01); *H04W 84/20* (2013.01)
(58) Field of Classification Search
   CPC ... H04W 84/18; H04W 76/045; H04W 88/10; H04W 52/0212; H04W 84/20; H04W 4/006; H04W 4/08; H04L 67/1044; H04L 67/1048
   See application file for complete search history.

(56) References Cited

U.S. PATENT DOCUMENTS

| | | | | |
|---|---|---|---|---|
| 9,036,471 | B2* | 5/2015 | Fayssal | H04L 41/0866 370/230 |
| 9,042,940 | B2 | 5/2015 | Suzuki et al. | |
| 9,456,294 | B2 | 9/2016 | Suzuki | |
| 2002/0090968 | A1* | 7/2002 | Lee | H04W 72/1247 455/527 |
| 2002/0193073 | A1* | 12/2002 | Fujioka | H04W 84/20 455/41.1 |
| 2003/0100335 | A1* | 5/2003 | Gassho | H04L 12/5692 455/552.1 |
| 2003/0220110 | A1* | 11/2003 | Kizu | H04W 28/14 455/445 |
| 2004/0078449 | A1* | 4/2004 | Tanaka | H04L 67/42 709/208 |
| 2006/0116075 | A1 | 6/2006 | Gallo | |
| 2008/0117477 | A1 | 5/2008 | Fujise | |
| 2008/0273541 | A1* | 11/2008 | Pharn | H04L 65/4076 370/400 |
| 2009/0210492 | A1* | 8/2009 | Guislain | H04L 63/102 709/204 |
| 2009/0307359 | A1* | 12/2009 | Akita | G06F 3/1213 709/228 |
| 2010/0142502 | A1* | 6/2010 | Shiraki | H04W 12/06 370/338 |
| 2011/0047219 | A1* | 2/2011 | Tripathi | H04L 12/581 709/206 |
| 2011/0122434 | A1* | 5/2011 | Kim | G06F 3/1203 358/1.15 |
| 2011/0177813 | A1* | 7/2011 | Uemura | H04W 76/027 455/435.1 |
| 2011/0194147 | A1* | 8/2011 | Kato | B41J 29/393 358/1.15 |
| 2011/0237241 | A1* | 9/2011 | Nagasaki | H04L 41/0803 455/422.1 |
| 2012/0105887 | A1* | 5/2012 | Osaki | G06F 3/1219 358/1.13 |
| 2012/0203396 | A1 | 8/2012 | Ochi | |
| 2012/0274972 | A1* | 11/2012 | Nishikawa | G06K 15/4055 358/1.14 |
| 2013/0237224 | A1* | 9/2013 | Fujino | H04W 60/00 455/435.1 |
| 2013/0260683 | A1* | 10/2013 | Suzuki | H04W 4/008 455/41.1 |
| 2013/0260819 | A1 | 10/2013 | Suzuki et al. | |
| 2013/0273850 | A1 | 10/2013 | Kim et al. | |
| 2013/0309968 | A1 | 11/2013 | Suzuki | |
| 2015/0126115 | A1* | 5/2015 | Yun | H04L 63/0492 455/41.1 |

FOREIGN PATENT DOCUMENTS

| | | |
|---|---|---|
| JP | 2004-128709 A | 4/2004 |
| JP | 2004-289723 A | 10/2004 |
| JP | 2008-131445 A | 6/2008 |
| JP | 2012-165241 A | 8/2012 |
| JP | 2013-214801 A | 10/2013 |
| JP | 2013-239906 A | 11/2013 |
| WO | 2004-056052 A2 | 7/2004 |

OTHER PUBLICATIONS

Jun. 26, 2015—(EP) Extended Search Report—App 15152530.0.
Mar. 14, 2017—(JP) Notification of Reason for Rejection—App 2014-012494.
Nov. 14, 2017—(JP) Decision of Rejection—App 2014-012494.

* cited by examiner

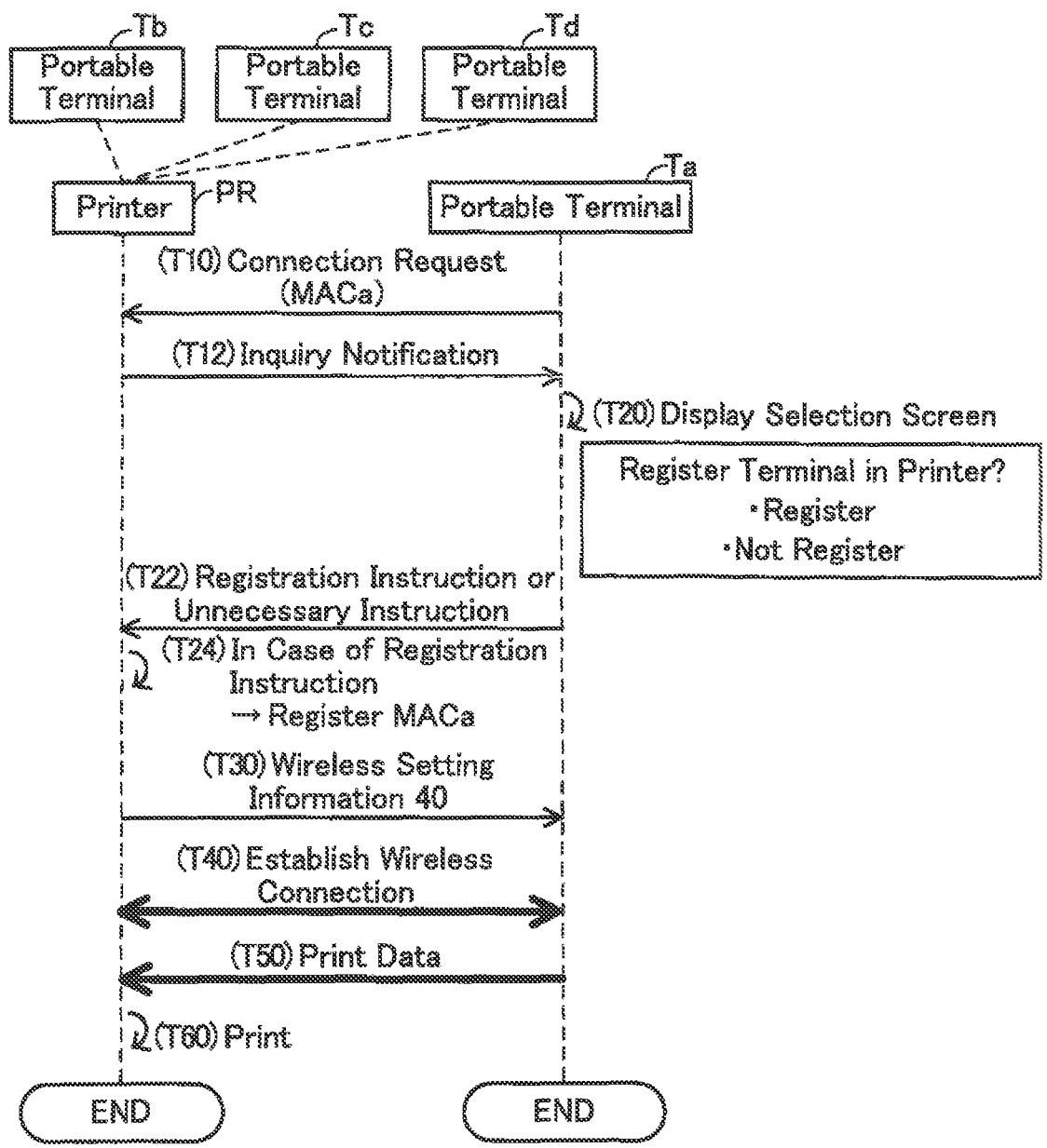

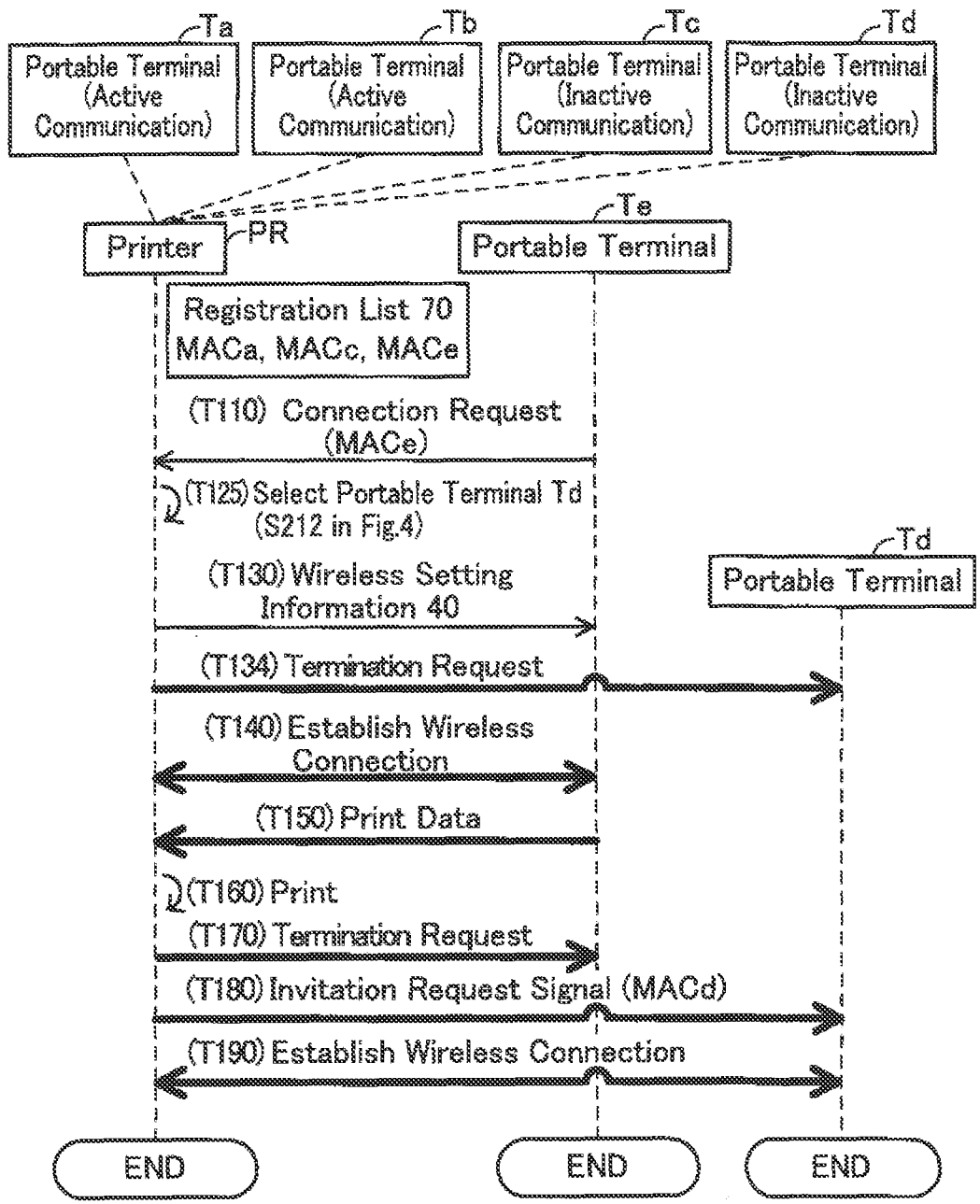

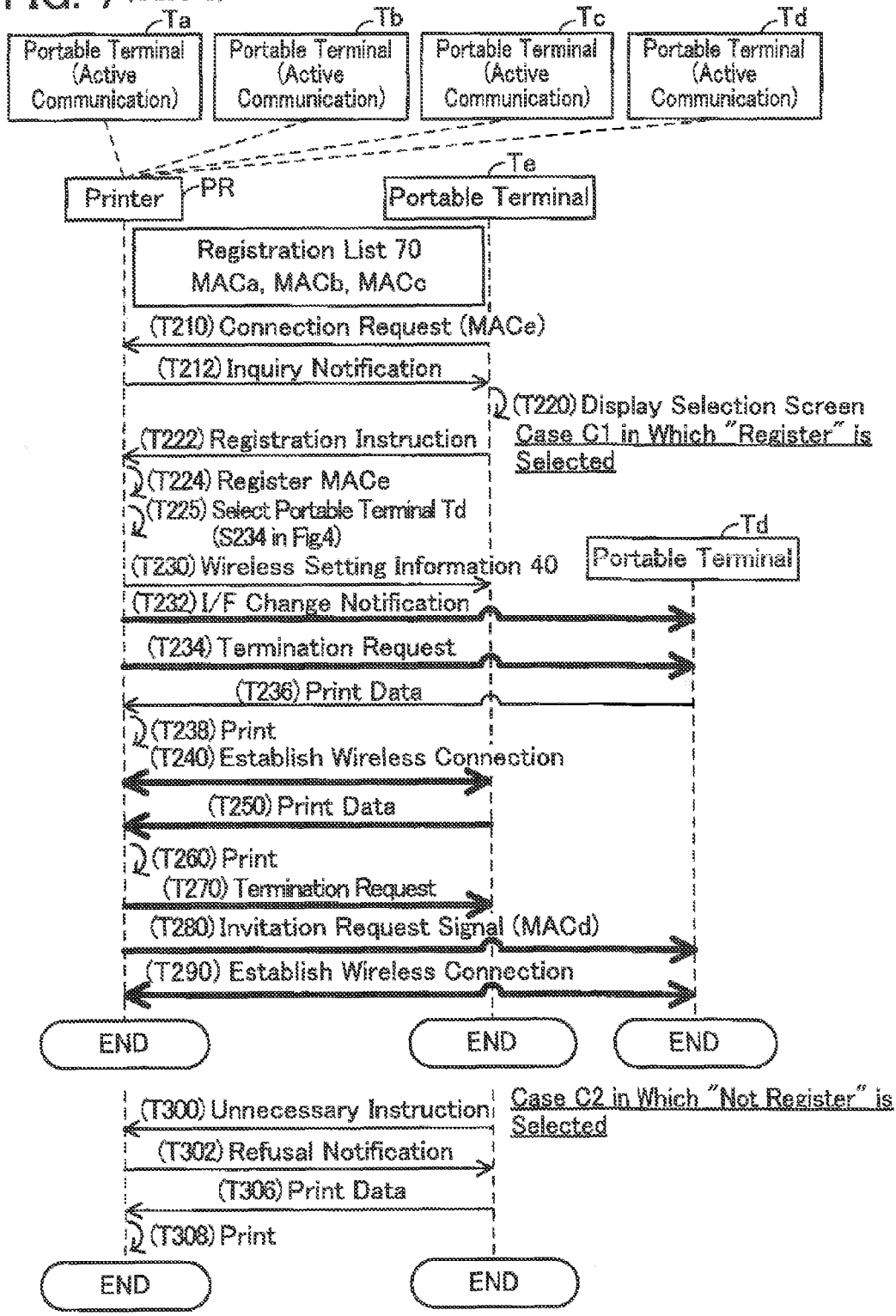
FIG. 7 (Case C)

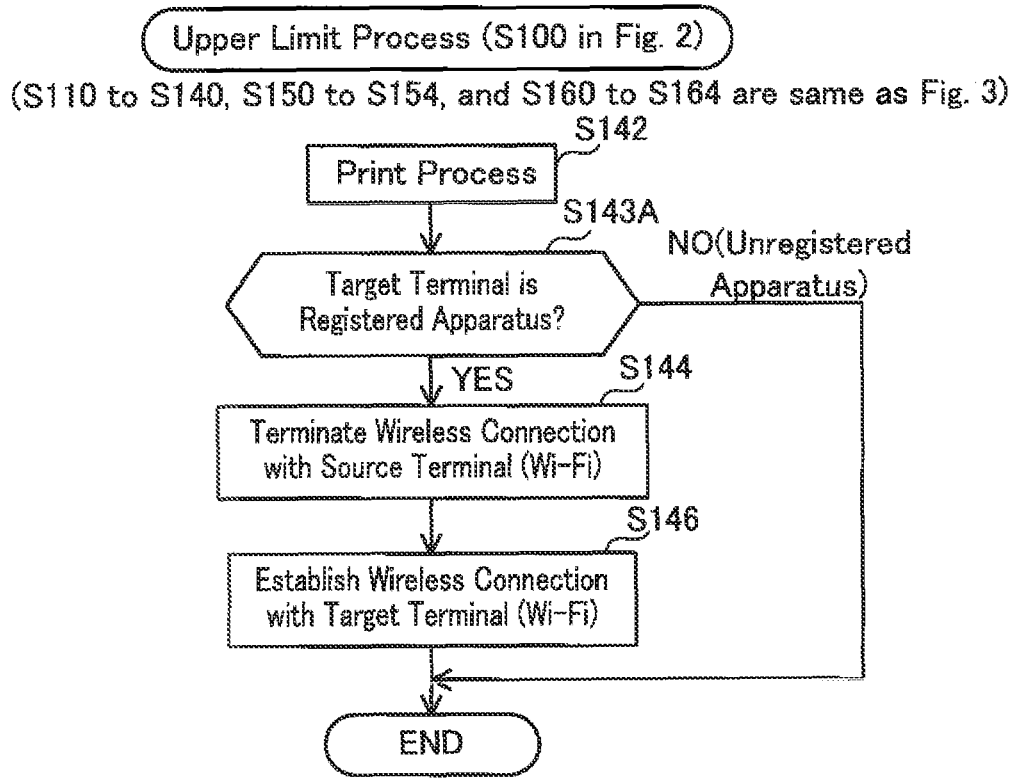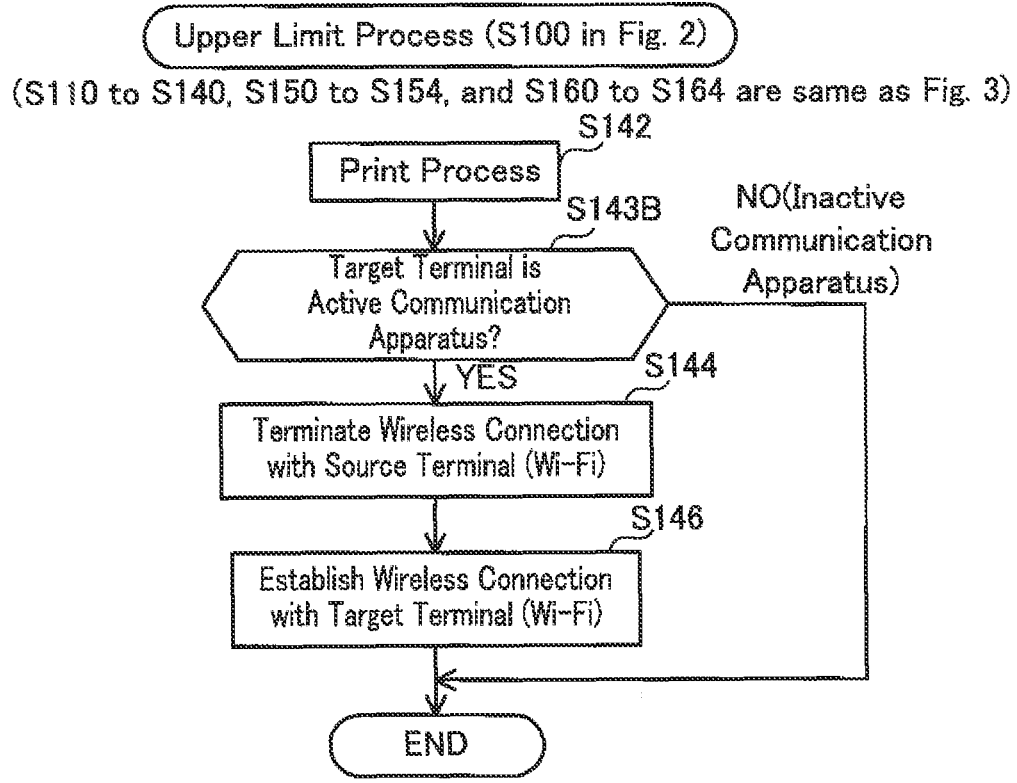

WIRELESS COMMUNICATION DEVICE CAPABLE OF OPERATING AS MASTER STATION OF WIRELESS NETWORK

CROSS-REFERENCE TO RELATED APPLICATIONS

This application claims priority to Japanese Patent Application No. 2014-012494, filed on Jan. 27, 2014, the contents of which are hereby incorporated by reference into the present application.

TECHNICAL FIELD

The present specification discloses a wireless communication device capable of operating as a master station of a wireless network.

DESCRIPTION OF RELATED ART

In a case where a network including a plurality of communication devices is formed, when a communication device which manages the network (called "managing communication device" below) receives a connection request from a communication device outside the network, the managing communication device confirms the number of connected communication devices that are currently connected to the network. In the case where the number of connected communication devices exceeds a predetermined value, the managing communication device determines whether or not a communication device is present that is in an inactive communication state, and terminates the communication device in the inactive communication state from the network. Thereby, the number of connected communication devices in the network becomes less than an upper limit number that is the predetermined value. As a result, the communication device that is the source of the connection request can be connected to the network.

SUMMARY

In the present specification, a technique is provided which may allow a novel and appropriate process to be performed, in a case where a wireless communication device, that is operating as a master station of a wireless network, receives a wireless connection request from an external apparatus under a state of a number of slave apparatuses being equal to an upper limit number.

A wireless communication device may comprise: a first wireless communication interface; a processor; and a memory storing computer-readable instructions therein. The computer-readable instructions, when executed by the processor, may cause the wireless communication device to execute: forming a wireless network in which the wireless communication device operates as a master station, the wireless network being for performing a wireless communication of target data with an external apparatus via the first wireless communication interface; receiving a wireless connection request from a specific external apparatus; determining, in a case where the wireless connection request is received from the specific external apparatus, whether a number of slave apparatuses is equal to an upper limit number K, the K being an integer equal to or more than 1, the slave apparatus being an external apparatus operating as a slave station in the wireless network; terminating a wireless connection with a target apparatus included in K slave apparatuses, so as to cause the target apparatus to secede from the wireless network, in a case where it is determined that the number of slave apparatuses is equal to the upper limit number K; automatically establishing a wireless connection with the specific external apparatus via the first wireless communication interface, so as to cause the specific external apparatus to participate as the slave station in the wireless network, as the target apparatus has seceded from the wireless network; performing a wireless communication of first target data with the specific external apparatus via the first wireless communication interface by using the wireless network, while the specific external apparatus participates in the wireless network; automatically terminating the wireless connection with the specific external apparatus, so as to cause the specific external apparatus to secede from the wireless network, as the wireless communication of the first target data has been completed; and automatically establishing a wireless connection with the target apparatus via the first wireless communication interface, so as to cause the target apparatus to participate as the slave station in the wireless network again, as the specific external apparatus has seceded from the wireless network.

A control method and computer-readable instructions for implementation of the wireless communication device, and a non-transitory computer-readable recording medium in which the computer-readable instructions are stored, are also novel and useful. Moreover, a system comprising the wireless communication device and any of apparatus (e.g. specific external apparatus, target apparatus) is also novel and useful.

BRIEF DESCRIPTION OF THE DRAWINGS

FIG. 5 illustrates a sequence diagram of a case A of receiving a connection request under a state of the number of slave apparatuses being less than an upper limit number;

FIG. 6 illustrates a sequence diagram of a case B of receiving a connection request under a state of the number of slave apparatuses being equal to the upper limit number;

FIG. 7 illustrates a sequence diagram of a case C of receiving a connection request under a state of the number of slave apparatuses being equal to the upper limit number;

FIG. 8 illustrates a flowchart of a modification 12;

FIG. 9 illustrates a flowchart of a modification 13; and

EMBODIMENT

Figure 1:
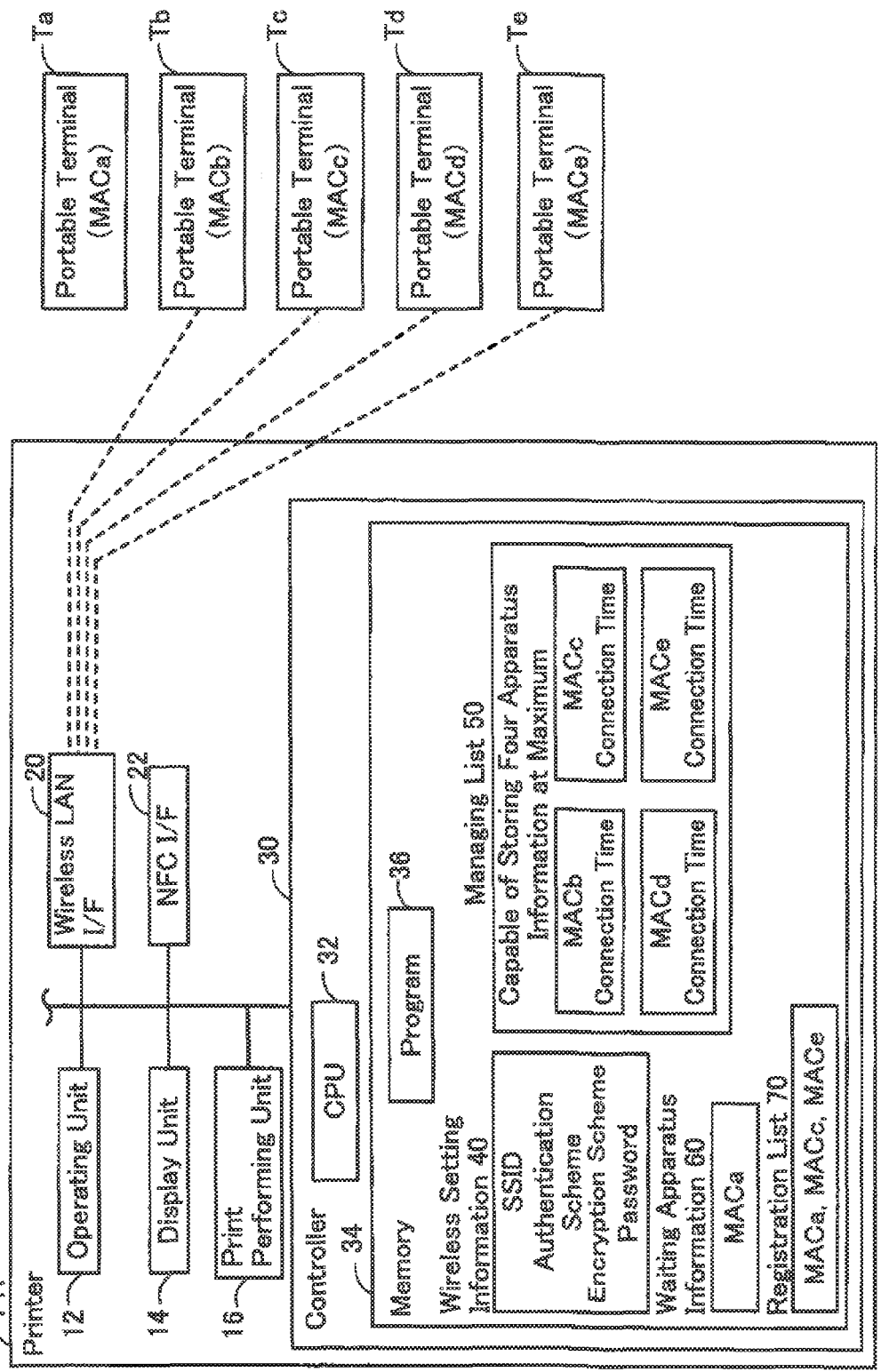
FIG. 1 illustrates a configuration of a communication system.

Configuration of System; FIG. 1

A communication system 2 of the present embodiment comprises a printer PR, and a plurality of portable terminals Ta to Te. The printer PR and the portable terminals Ta to Te are capable of performing a Wi-Fi communication ("Wi-Fi" is the registered trademark of Wi-Fi Alliance), this being a wireless communication in accordance with a Wi-Fi scheme developed by Wi-Fi Alliance and, further, are capable of performing an NFC communication, this being a wireless communication in accordance with an NFC (abbreviation of Near Field Communication) scheme.

(Configuration of Printer PR)

The printer PR is a peripheral apparatus (i.e., peripheral apparatus of a PC (abbreviation of Personal Computer) or the like) which can perform a printing function. The printer PR comprises an operating unit 12, a display unit 14, a print performing unit 16, a wireless LAN (abbreviation of Local Area Network) interface 20, an NFC interface 22, and a controller 30. The units 12 to 30 are connected to a bus line (reference number omitted). Hereinafter, the interface will be described as "I/F".

The operating unit 12 comprises a plurality of keys. A user can input various instructions to the printer PR by operating the operating unit 12. The display unit 14 is a display for displaying various pieces of information. The print performing unit 16 is a printing mechanism such as an ink jet printing or a laser printing scheme.

The wireless LAN I/F 20 is an interface for performing a Wi-Fi communication according to the Wi-Fi scheme. The Wi-Fi scheme, for example, is a wireless communication scheme for performing wireless communication in accordance with the standard of 802.11 of IEEE (abbreviation of The Institute of Electrical and Electronics Engineers, Inc.) or a standard (e.g., 802.11a, 11b, 11g, 11n, etc.) equivalent to this standard. More specifically, the wireless LAN I/F 20 is an I/F supporting the WFD (abbreviation of Wi-Fi Direct; "Wi-Fi Direct" is the registered trademark of Wi-Fi Alliance) scheme developed by Wi-Fi Alliance. Consequently, the controller 30 can perform a Wi-Fi communication via the wireless LAN I/F 20 by using a WFD scheme wireless network (called "WFDNW" below).

Moreover, details of the WFD scheme are described in "Wi-Fi Peer-to-Peer (P2P) Technical Specification Version 1.1." created by the Wi-Fi Alliance. Further, details of the WFD scheme are disclosed in US Patent Application No. 2013/0260683 and, in the present specification, are cited by reference to the literature.

The NFC I/F 22 is an interface for performing an NFC wireless communication (i.e., Near Field Communication) in accordance with the NFC scheme. The NFC scheme, for example, is a wireless communication scheme in accordance with the international standard of, e.g., ISO/IEC 21481 or ISO/IEC 18092.

The wireless LAN I/F 20 and the NFC I/F 22 are constituted by physically different chips. A communication speed of a wireless communication via the wireless LAN I/F 20 (e.g., a maximum communication speed is 11 to 600 Mbps) is faster than a communication speed of a wireless communication via the NFC I/F 22 (e.g., a maximum communication speed is 106 to 424 Kbps). A frequency of a carrier wave (e.g., a 2.4 GHz band, a 5.0 GHz band) upon a wireless communication via the wireless LAN I/F 20 is different from a frequency of a carrier wave (e.g. a 13.56 MHz band) upon a wireless communication via the NFC I/F 22. Further, a maximum distance (e.g., 100 m) at which a wireless communication can be performed via the wireless LAN I/F 20 is greater than a maximum distance (e.g., 10 cm) at which a wireless communication can be performed via the NFC I/F 22.

The controller 30 comprises a CPU 32 and a memory 34. The CPU 32 is a processor which performs various processes in accordance with a program 36 stored in the memory 34. The memory 34 can store not only the program 36, but also wireless setting information 40, a managing list 50, waiting apparatus information 60, and a registration list 70.

In case a WFDNW (simply called "WFDNW" below) is formed in which the printer PR operates as a G/O (abbreviation of Group Owner) apparatus of the WFD scheme, the wireless setting information 40 is information to be used in the WFDNW. The wireless setting information 40 includes SSID (abbreviation of Service Set Identifier), authentication scheme, encryption scheme, and password. The SSID is a network identifier for identifying the WFDNW. The authentication scheme, encryption scheme, and password are information for performing apparatus authentication, data encryption, etc. in the WFDNW.

Moreover, the G/O apparatus (i.e., the printer PR) is an apparatus which forms the WFDNW, in other words, an apparatus capable of causing the WFDNW to disappear. The G/O apparatus is capable of performing the wireless communication of data with an external apparatus participating in the WFDNW, i.e., with an external apparatus (called "slave apparatus" below) which has established a wireless connection with the printer PR via the wireless LAN I/F 20. The slave apparatus may be a CL (abbreviation of Client) apparatus of the WFD scheme, or may be a so-called legacy apparatus (i.e., an apparatus not supporting the WFD scheme). The G/O apparatus is capable of receiving data from the slave apparatus and performing a process using that data (e.g., a print process). Further, the G/O apparatus can relay a wireless communication of data between a pair of external apparatuses. Thus, the G/O apparatus is an apparatus that manages the WFDNW, and could also be termed a so-called master station.

Apparatus information of each slave apparatus participating in the WFDNW is written in the managing list 50. In the present embodiment, the printer PR which is the G/O apparatus is capable of establishing a wireless connection with a maximum of four slave apparatuses (i.e., an upper limit number of the slave apparatuses is "4"). Consequently, a maximum of four items of apparatus information are written in the managing list 50. Each apparatus information includes a MAC address of the slave apparatus, and a connection time, which is the time of establishing a wireless connection with the slave apparatus.

The waiting apparatus information 60 is a MAC address of an external apparatus whose wireless connection with the printer PR is temporarily terminated, i.e., an external apparatus whose wireless connection with the printer PR is to be re-established.

The MAC address of the external apparatus is written in the registration list 70 in response to a request by a user of the external apparatus. As described in detail later, the external apparatus identified by the MAC address written in the registration list 70 maintains, as far as possible, the wireless connection with the printer PR. That is, the MAC address of the external apparatus which is to maintain the wireless connection with the printer PR is written in the registration list 70. For example, the user of the external apparatus registers the MAC address of the external apparatus in a printer that is used frequently (e.g., PR), and does not register the MAC address of the external apparatus in a printer that is used temporarily. Thereby, the user can maintain, as far as possible, the wireless connection between the external apparatus and the printer that is used frequently (i.e., it is possible to prevent the wireless connection from being terminated).

(Configuration of Portable Terminals Ta to Te)

Each of the portable terminals Ta to Te is a portable terminal device such as a mobile telephone (e.g., smartphone), PDA, notebook PC, tablet PC, portable music playback device, portable movie playback device, etc. Below, the MAC address of each of the portable terminals Ta to Te is described as "MACa" to "MACe", respectively.

Figure 2:
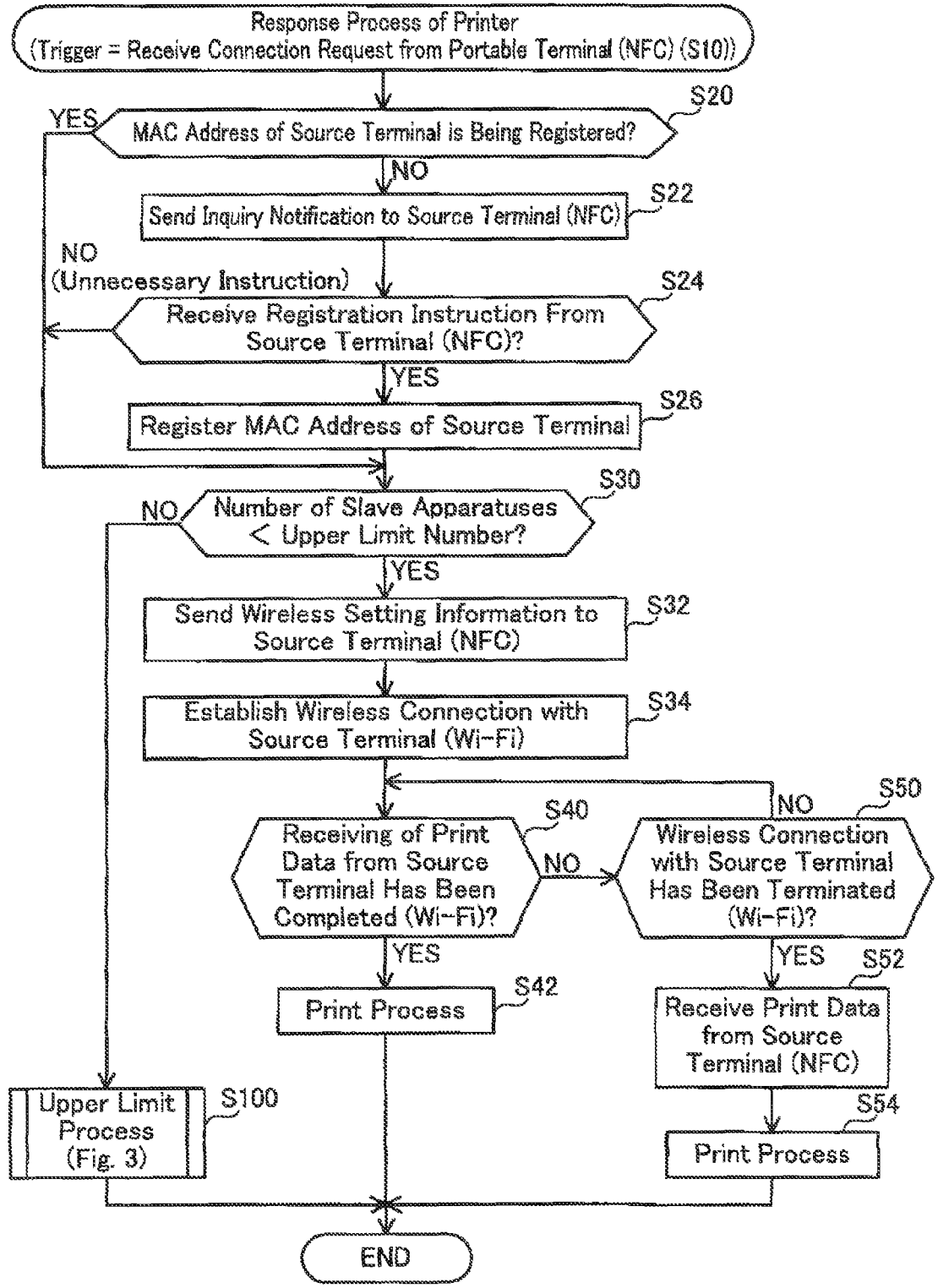
FIG. 2 illustrates a flowchart of a response process of a printer.

(Process Performed by Printer PR; FIG. 2)

Next, the contents of the process performed by the CPU 32 of the printer PR in accordance with the program 36 will be described with reference to FIG. 2.

In S2, with turning ON a power source of the printer PR as a trigger, the CPU 32 causes the state of the printer PR to spontaneously transit from the device state of the WFD scheme to the G/O state of the WFD scheme, and form a WFDNW. At this step, not even one slave apparatus is participating in the WFDNW. That is, a WFDNW is formed in which only the printer PR which is the G/O apparatus is participating. When the WFDNW is formed, the CPU 32 creates the wireless setting information 40 to be used in the WFDNW (see FIG. 1). For example, the SSID and password in the wireless setting information 40 may be created by the CPU 32 randomly selecting character strings. Further, the authentication scheme and encryption scheme in the wireless setting information 40 may be determined in advance. The CPU 32 stores the created wireless setting information 40 in the memory 34.

In S10, the CPU 32 receives a connection request from any portable terminal via the NFC I/F 22. The connection request is a command for requesting the printer PR to establish a wireless connection via the wireless LAN I/F 20. The connection request includes a MAC address of a portable terminal that is the source of the connection request. Below, the portable terminal that is the source of the connection request is called "source terminal". The CPU 32 performs a response process from S20 onwards with receiving a connection request from the source terminal as a trigger.

Moreover, in case of receiving a connection request from another source terminal under a state of performing the response process from S20 onwards due to receiving a connection request from any of the source terminals, the CPU 32 performs a response process in a separate thread to the first response process. That is, the CPU 32 may perform two or more response processes simultaneously.

In S20, the CPU 32 determines whether the MAC address of the source terminal included in the connection request of S10 has been registered in the registration list 70 in the memory 34 (see FIG. 1). In case the MAC address of the source terminal has been registered in the registration list 70 (YES in S20), the CPU 32 skips S22 to S26, and proceeds to S30, and in case the MAC address of the source terminal has not been registered in the registration list 70 (NO in S20), the CPU 32 proceeds to S22.

In S22, the CPU 32 sends an inquiry notification to the source terminal via the NFC I/F 22. The inquiry notification is a notification for inquiring the user of the source terminal whether to register the MAC address of the source terminal in the registration list 70.

Next, in S24, the CPU 32 determines whether a registration instruction has been received from the source terminal via the NFC I/F 22. The registration instruction is an instruction sent from the source terminal in the case where the user of the source terminal desires registration of the MAC address. In case of receiving the registration instruction from the source terminal (YES in S24), in S26 the CPU 32 registers the MAC address of the source terminal in the registration list 70. Upon ending S26, the CPU 32 proceeds to S30. On the other hand, in case of receiving an unnecessary instruction from the source terminal (NO in S24), the CPU 32 skips S26 (i.e., does not register the MAC address), and proceeds to S30. The unnecessary instruction is an instruction sent from the source terminal in the case where the user of the source terminal does not desire registration of the MAC address.

In S30, the CPU 32 determines whether the number of slave apparatuses participating in the WFDNW formed in S2 is less than the upper limit number "4". Specifically, by counting the number of items of apparatus information written in the managing list 50 in the memory 34, the CPU 32 identifies the number of slave apparatuses (any from "0" to "4"), and determines whether the identified number is less than "4". In the case where the number of slave apparatuses is less than "4" (YES in S30), the CPU 32 proceeds to S32, and in the case where the number of slave apparatuses is "4" (NO in S30), the CPU 32 performs an upper limit process of S100 (see FIG. 3).

In S32, the CPU 32 sends the wireless setting information 40 in the memory 34 to the source terminal via the NFC I/F 22. Thereby, the wireless setting information 40 is used by the source terminal in the next step S34.

In S34, the CPU 32 establishes a wireless connection with the source terminal via the wireless LAN I/F 20. Specifically, the CPU 32 first receives a Probe Request signal including the SSID in the wireless setting information 40 from the source terminal via the wireless LAN I/F 20, and sends a Probe Response signal to the source terminal. Next, the CPU 32 performs the communication of various signals with the source terminal via the wireless LAN I/F 20. The various signals include, e.g., an Authentication Request/Response signal, Association Request/Response signal, WSC Exchange, 4-Way Handshake, etc. During the communication of the various signals, the CPU 32 receives signals that include various information (i.e., authentication scheme, encryption scheme, password) in the wireless setting information 40 from the source terminal, confirms that the various information is being used in the WFDNW, and sends a signal indicating that authentication succeeded to the source terminal. Thereby, the CPU 32 can establish a wireless connection with the source terminal, and cause the source terminal to participate in the WFDNW as a slave apparatus. Upon establishing the wireless connection with the source terminal, the CPU 32 writes one item of apparatus information in the managing list 50 (see FIG. 1), the apparatus information including the MAC address of the source terminal (i.e., the MAC address included in the connection request of S10) and the connection time (i.e., current time).

Next, the CPU 32 repeatedly executes the monitoring process of S40 and S50. In S40, the CPU 32 receives data (called "print data" below) representing an image of a print target from the source terminal via the wireless LAN I/F 20 by using the wireless connection with the source terminal (i.e., by using the WFDNW). Then, in S40, the CPU 32 monitors whether receiving of the print data has been completed. In the case where receiving of the print data has been completed (YES in S40), in S42 the CPU 32 supplies the print data to the print performing unit 16, and causes the print performing unit 16 to perform a print of the image represented by the print data. When S42 ends, the response process of FIG. 2 ends.

The print data has a comparatively large data size. Therefore, the communication speed of NFC communication is slower than the communication speed of Wi-Fi communication. Consequently, if a configuration is adopted in which a wireless communication of print data between the printer PR and the source terminal is performed using NFC communication, a long time for the wireless communication of the print data is required. In contrast, in S40 of the present embodiment, the printer PR and the source terminal perform a wireless communication of the print data by using a Wi-Fi communication, and consequently the wireless communication of the print data can be performed rapidly.

Moreover, in the case where S42 ends, the CPU 32 maintains a state in which the source terminal participates in the WFDNW as a slave apparatus without terminating the wireless connection with the source terminal. Consequently, in case the user of the source terminal again wishes to cause the printer PR to perform a print, the CPU 32 can receive the print data from the source terminal by using the WFDNW without again performing the processes of S10 to S34, and can again cause the print performing unit 16 to perform a print of the image.

Further, in S50, the CPU 32 monitors whether the wireless connection with the source terminal has been terminated, i.e., whether the source terminal has seceded from the WFDNW, before the receiving of the print data from the source terminal has been completed. For example, a situation is assumed in which, while the response process is being performed triggered by receiving a connection request from a first source terminal, the response process is started as a separate thread triggered by receiving a connection request from a second source terminal. In this case, the first wireless connection with the source terminal may be terminated due to a wireless connection with the second source terminal being established in the latter response process before the receiving of the print data from the first source terminal has been completed in the former response process (see S28 of FIG. 3 described below). When such an event occurs, in the former response process the CPU 32 determines that the wireless connection with the source terminal (i.e., the first source terminal) has been terminated before the receiving of the print data has been completed (YES in S50), and proceeds to S52.

Before S52 is performed, the CPU 32 has already received first partial data from among the print data from the source terminal via the wireless LAN I/F 20. In S52, the CPU 32 receives second partial data, which is remaining data from among the print data from the source terminal via the wireless NFC I/F 22. Then, in 854, the CPU 32 supplies the print data that includes the first partial data and the second partial data to the print performing unit 16, and causes the print performing unit 16 to perform a print of an image represented by the print data. When 854 ends, the response process of FIG. 2 ends.

Figure 3:
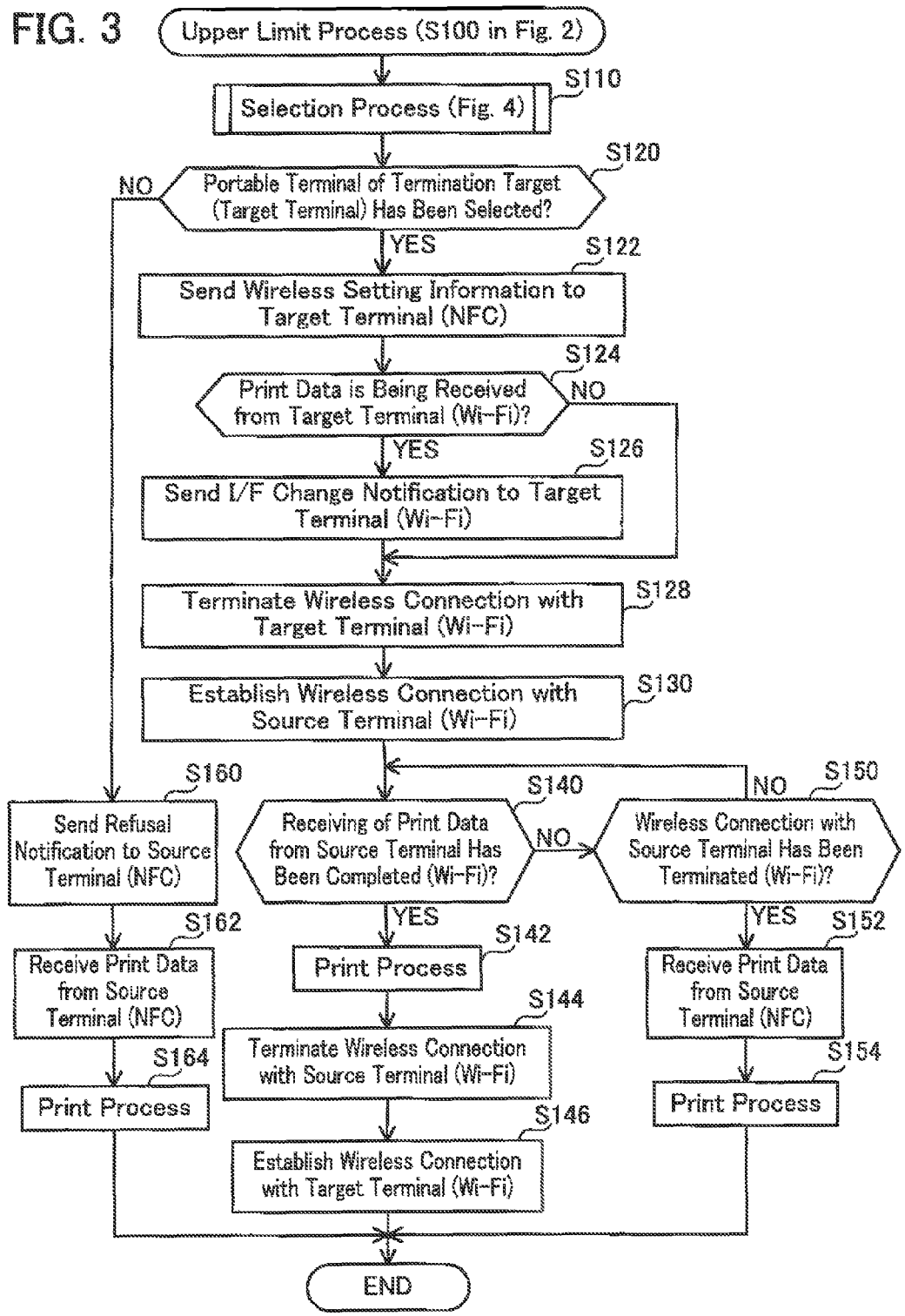
FIG. 3 illustrates a flowchart of an upper limit process of the printer.

(Upper Limit Process; FIG. 3)

Next, the contents of the upper limit process performed in S100 of FIG. 2 will be described with reference to FIG. 3. In S110, the CPU 32 performs a selection process for selecting, from among the four portable terminals (i.e., the four slave apparatuses) which have established a wireless connection with the printer PR, a portable terminal for which the wireless connection is to be terminated (i.e., termination target portable terminal).

In S120, the CPU 32 determines whether the termination target portable terminal could be selected in the selection process of S110. In the case where the termination target portable terminal could be selected (YES in S120), the CPU 32 proceeds to S122 and, in the case where the termination target portable terminal could not be selected (NO in S120), the CPU 32 proceeds to S160. Below, the termination target portable terminal selected in the selection process of S110 is called "target terminal".

In S122, the CPU 32 sends the wireless setting information 40 in the memory 34 to the source terminal via the NFC I/F 22. Next, in S124, the CPU 32 determines whether print data is being received from the target terminal via the wireless LAN I/F 20. In case print data is being received from the target terminal (YES in S124), the CPU 32 proceeds to S126, and in case print data is not being received from the target terminal (NO in S124), the CPU 32 skips S126, and proceeds to S128.

In S126, the CPU 32 sends an I/F change notification to the target terminal via the wireless LAN I/F 20. The I/F change notification is a command for notifying the target terminal that a wireless communication of uncommunicated data from among the print data is to be performed via the NFC I/F 22. As a result, in the response process of S52 (see FIG. 2) or S152 (see FIG. 3), whose starting is triggered by receiving the connection request from the target terminal, the CPU 32 can receive the uncommunicated data from the target terminal via the NFC I/F 22.

In S128, the CPU 32 sends a termination notification to the target terminal via the wireless LAN I/F 20, and terminates the wireless connection with the target terminal. The CPU 32 further writes, into the memory 34, the MAC address included in the apparatus information of the target terminal in the managing list 50 as the waiting apparatus information 60 (see FIG. 1). Then, the CPU 32 deletes the apparatus information of the target terminal from the managing list 50. Thereby, the CPU 32 can cause the target terminal to secede from the WFDNW. As a result, the number of slave apparatuses becomes "3", which is less than the upper limit number "4".

In S130, the CPU 32 automatically establishes a wireless connection with the source terminal via the wireless LAN I/F 20, and causes the source terminal to participate in the WFDNW as a slave apparatus. S130 is the same as S34 of FIG. 2. As a result of S130, the number of slave apparatuses becomes the upper limit number "4".

S140, S142, S150 to S154, which are performed next, are the same as S40, S42, S50 to S54 of FIG. 2. When S142 ends, in S144 the CPU 32 sends a termination notification to the source terminal via the wireless LAN I/F 20, and automatically terminates the wireless connection with the source terminal. The CPU 32 further deletes the apparatus information of the source terminal from the managing list 50. Thereby, the CPU 32 can cause the source terminal to secede from the WFDNW. As a result, the number of slave apparatuses becomes "3", which is less than the upper limit number "4".

Next, in S146, the CPU 32 again automatically establishes a wireless connection with the target terminal via the wireless LAN I/F 20. Specifically, the CPU 32 sends an Invitation Request signal of the WFD scheme to the target terminal via the wireless LAN I/F 20. The Invitation Request signal is a signal for prompting the target terminal to participate in the WFDNW, and includes the MAC address of the target terminal, which is the waiting apparatus information 60 in the memory 34. Then, as in S34 of FIG. 2 and S130 of FIG. 3, the CPU 32 performs communication of various signals, and again establishes a wireless connection with the target terminal. Moreover, in the case where the target terminal supports the WFD scheme, the target terminal can respond to the Invitation Request signal. Consequently, the CPU 32 can perform the communication of the various signals with the sending of the Invitation Request signal as a trigger, and consequently can rapidly establish a wireless connection with the target terminal. However, in the case where the target terminal does not support the WFD scheme, the target terminal cannot respond to the Invitation Request signal. Consequently, the CPU 32 waits until receiving the Probe Request signal from the target terminal, performs the communication of the various signals with the Probe Request signal as a trigger, and establishes a wireless connection with the target terminal.

In S146, further, the CPU 32 deletes the waiting apparatus information 60 in the memory 34, and again writes the apparatus information of the target terminal in the managing list 50. Thereby, the CPU 32 can cause the target terminal to participate as a slave apparatus in the WFDNW again. As a result, the number of slave apparatuses becomes the upper limit number "4". That is, the CPU 32 can cause a return to the WFDNW and the same state before reception of the connection request of S10. When S146 or S154 ends, the upper limit process of FIG. 3 ends, and consequently the response process of FIG. 2 ends.

As described above, in the case where a termination target portable terminal could not be selected in the selection process of S110 (NO in S120), the process proceeds to S160. In S160, the CPU 32 sends a refusal notification to the source terminal via the NFC I/F 22. The refusal notification is a command for notifying the source terminal that a wireless connection cannot be established via the wireless LAN I/F 20. Further, the refusal notification is a command for notifying the source terminal that the wireless communication of the print data must be performed via the NFC I/F 22.

Next, in S162, the CPU 32 receives the print data from the target terminal via the NFC I/F 22. Then, in S164, the CPU 32 supplies the print data to the print performing unit 16, and causes the print performing unit 16 to perform a print of an image. When S164 ends, the upper limit process of FIG. 3 ends, and consequently the response process of FIG. 2 ends.

Figure 4:
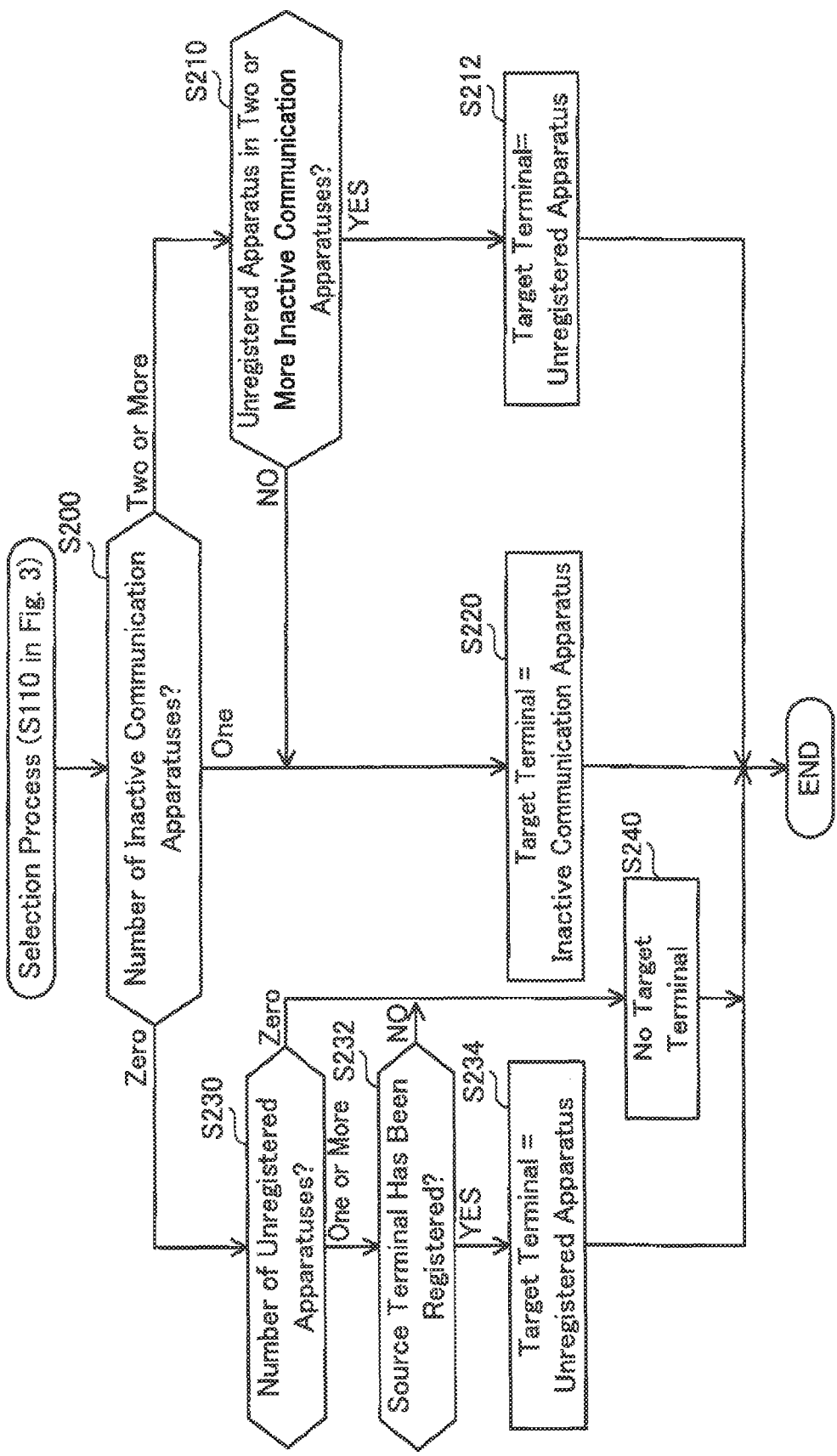
FIG. 4 illustrates a flowchart of a selection process of the printer.

(Selection Process; FIG. 4)

Next, contents of the selection process performed in S110 of FIG. 3 will be described with reference to FIG. 4. In S200, the CPU 32 identifies the number of slave apparatuses, from among the four slave apparatuses, which are not performing a communication of print data with the printer PR by using the WFDNW (called "inactive communication apparatus" below). The CPU 32 proceeds to S210 in the case where the number of inactive communication apparatuses is two or more, proceeds to S220 in the case where the number of inactive communication apparatuses is only one, and proceeds to S230 in the case where the number of inactive communication apparatuses is zero.

In S210, the CPU 32 determines whether a slave apparatus for which the MAC address has not been written in the registration list 70 in the memory 34 (called "unregistered apparatus" below) is present among the two or more inactive communication apparatuses. The CPU 32 proceeds to S212 in the case where the unregistered apparatus is present (YES in S210), and proceeds to S220 in the case where the unregistered apparatus is not present (NO in S210).

In S212, the CPU 32 selects the unregistered apparatus as the target terminal (i.e., termination target portable terminal). For example, in the case where only one unregistered apparatus is present among the two or more inactive communication apparatuses, the CPU 32 selects the unregistered apparatus as the target terminal. Further, e.g., in the case where two or more unregistered apparatuses are present among the two or more inactive communication apparatuses, the CPU 32 selects, from among the two or more unregistered apparatuses, the one unregistered apparatus having the oldest connection time (see the managing list 50 of FIG. 1) as the target terminal. However, in a modification, the CPU 32 may select the target terminal by randomly selecting one unregistered apparatus from among the two or more unregistered apparatuses. When S212 ends, the selection process ends.

In S220, the CPU 32 selects the inactive communication apparatus as the target terminal. For example, in the case where only one inactive communication apparatus is present ("One" in S200), the CPU 32 selects the inactive communication apparatus as the target terminal. Further, e.g., in the case where the unregistered apparatus is not present among the two or more inactive communication apparatuses (NO in S210), the CPU 32 selects, from among the two or more inactive communication apparatuses, the one inactive communication apparatus having the oldest connection time as the target terminal. However, in a modification, the CPU 32 may select the target terminal by randomly selecting one inactive communication apparatus from among the two or more inactive communication apparatuses. When S220 ends, the selection process ends.

As described above, in the present embodiment, in case a slave apparatus which is performing a communication of the print data with the printer PR by using the WFDNW (called "active communication apparatus" below), and an inactive communication apparatus are present among the four slave apparatuses, the printer PR selects the inactive communication apparatus as the target terminal in priority basis (S212, S220). Thereby, termination of the wireless connection with the active communication apparatus can be prevented. As a result, the printer PR can appropriately receive the print data from the active communication apparatus.

Further, in the present embodiment, in case a slave apparatus whose MAC address is written in the registration list 70 (called "registered apparatus" below), and an unregistered apparatus are present among the two or more inactive communication apparatuses, the printer PR selects the unregistered apparatus as the target terminal in priority basis (S212). Thereby, termination of the wireless connection with the registered apparatus can be prevented. That is, it is possible to prevent termination of the wireless connection with the portable terminal owned by a user who wishes to maintain the wireless connection with the printer PR.

In S230, the CPU 32 identifies the number of unregistered apparatuses among the four slave apparatuses. The CPU 32 proceeds to S232 in the case where the number of unregistered apperatuses is one or more, and proceeds to S240 in the case where the number of unregistered apparatuses is zero.

In S232, the CPU 32 determines whether the MAC address of the source terminal has been registered in the registration list 70 in the memory 34. In the case where the MAC address of the source terminal has been registered in the registration list 70 (YES in S232), the CPU 32 proceeds to S234, and in the case where the MAC address of the source terminal has not been registered in the registration list 70 (NO in S232), the CPU 32 proceeds to S240.

In S234, the CPU 32 selects an unregistered apparatus as the target terminal. For example, in the case where only one unregistered apparatus is present among the four slave apparatuses, the CPU 32 selects that unregistered apparatus as the target terminal. Further, e.g., in the case where two or more unregistered apparatuses are present among the four slave apparatuses, the CPU 32 selects the one unregistered apparatus having the oldest connection time from among the two or more unregistered apparatuses as the target terminal. However, in a modification, the CPU 32 may select the target terminal by randomly selecting one unregistered apparatus from among the two or more unregistered apparatuses. When S234 ends, the selection process ends.

At the stage of performing S234, all of the four slave apparatuses are performing communication of print data with the printer PR. Consequently, when any of the slave apparatuses are selected as the target terminal, the printer PR determines YES in S124 of FIG. 3, and performs S126. As a result, the printer PR performs an NFC communication and receives, from the target terminal, uncommunicated data among the print data (S52 of FIG. 2 or S152 of FIG. 3).

As described above, in the present embodiment, in the case where all of the four slave apparatuses are active communication apparatuses, and a registered apparatus and an unregistered apparatus are present among the four slave apparatuses, the printer PR selects the unregistered apparatus as the target terminal in priority basis (S234). Thereby, it is possible to prevent termination of the wireless connection with the portable terminal owned by a user who wishes to maintain the wireless connection with the printer PR.

In S240, since a slave apparatus that satisfies the termination condition is not present, the CPU 32 ends the selection process without selecting a target terminal. Consequently, the printer PR determines NO in S120 of FIG. 3, and performs S160 to S164.

(Specific Cases)

Next, specific cases A to C will be described with reference to FIG. 5 to FIG. 7. Case A to case C are realized by the flowcharts of FIG. 2 to FIG. 4. In FIG. 5 to FIG. 7, the thin line arrow and the thick line arrow indicate "NFC communication" and "Wi-Fi communication", respectively.

(Case A; FIG. 5)

In an initial state of case A of FIG. 5, the printer PR has established a wireless connection with three portable terminals Tb to Td. That is, the number of slave apparatuses is "3", which is less than the upper limit number "4".

In T10, the printer PR receives a connection request including the MACa from the portable terminal Ta by using the NFC communication (S10 of FIG. 2). In T12, the printer PR sends an inquiry notification to the portable terminal Ta by using the NFC communication (NO in S20, S22).

In 120, the portable terminal Ta receives the inquiry notification from the printer PR, and displays the selection screen. The selection screen includes character strings "Register" and "Not Register" for enquiring the user whether or not to register the MACa of the portable terminal Ta in the printer PR.

In the case where "Register" is selected in the selection screen, in T22 the printer PR receives a registration instruction from the portable terminal Ta by using the NFC communication. Further, in the case where "Not Register" is selected in the selection screen, in T22 the printer PR receives an unnecessary instruction from the portable terminal Ta by using the NFC communication. Then, in T24, in case of receiving the registration instruction from the portable terminal Ta (YES in S24 of FIG. 2), the printer PR registers the MACa in the registration list 70 in the memory 34 (S26).

In T30, the printer PR determines that the number of slave apparatuses is "3", which is less than the upper limit number "4" (YES in S30 of FIG. 2), and sends the wireless setting information 40 in the memory 34 to the portable terminal Ta by using the NFC communication (S32). Then, in T40, the printer PR establishes a wireless connection with the portable terminal Ta by using the Wi-Fi communication and therefore causes the portable terminal Ta to participate in the WFDNW as a slave apparatus (S34).

Next, in T50, the printer PR receives print data from the portable terminal Ta by using the WFDNW (i.e., by using the Wi-Fi communication) (YES in S40 of FIG. 2). Then, in T60, the printer PR performs printing of an image represented by the print data (S42). Then, the printer PR does not terminate the wireless connection with the portable terminal Ta (does not perform the termination process after S42). Consequently, although not shown, in case of the user of the portable terminal Ta desiring to cause the printer PR to again perform a print, the printer PR can receive print data from the portable terminal Ta by using the WFDNW, and appropriately perform a print.

(Case B; FIG. 6)

In an initial state of case B of FIG. 6, the printer PR has established a wireless connection with the four portable terminals Ta to Td. That is, the number of slave apparatuses is the upper limit number "4". By using the WFDNW, the printer PR is receiving print data from the two portable terminals Ta, Tb, and is not receiving print data from the two portable terminals Tc, Td. Further, the MACa, MACc, and MACe are registered in the registration list 70 in the memory 34 of the printer PR.

In T110, the printer PR receives a connection request including the MACe from the portable terminal Te by using the NFC communication (S10 of FIG. 2). The printer PR determines that the MACe of the portable terminal Te has been registered in the registration list 70 (YES in S20), and does not send an inquiry notification to the portable terminal Te. Thereby, under a state of the MACe of the portable terminal Te being registered in the registration list 70, it is possible to prevent the selection screen of T20 of FIG. 5 being displayed in the portable terminal Te. That is, the user of the portable terminal Te does not need to again perform a selection on the selection screen.

In T125, the printer PR determines that the number of slave apparatuses is equal to the upper limit number "4" (NO in S30 of FIG. 2), and selects the termination target portable terminal (i.e., the target terminal) (S110 of FIG. 3). Specifically, the printer PR determines that two inactive communication apparatuses (i.e., the portable terminals Tc, Td) are present among the four slave apparatuses ("Two or more" in S200 of FIG. 4), determines that an unregistered apparatus (i.e., the portable terminal Td) is present among the two inactive communication apparatuses (YES in S210), and selects the portable terminal Td as the target terminal (S212).

Next, in T130, the printer PR sends the wireless setting information 40 in the memory 34 to the portable terminal Te by using the NFC communication (YES in S120 of FIG. 3, S122). Then, in T134, the printer PR sends a termination request to the portable terminal Td by using the Wi-Fi communication, terminates the wireless connection with the portable terminal Td and therefore causes the portable terminal Td to secede from the WFDNW (NO in S124, S128). Thereby, the number of slave apparatuses becomes "3", which is less than the upper limit number "4".

Next, in T140, the printer PR establishes a wireless connection with the portable terminal Te by using the Wi-Fi communication and therefore causes the portable terminal Te to participate in the WFDNW as a slave apparatus (S130 of FIG. 3). Thereby, the number of slave apparatuses becomes the upper limit number "4". Next, in T150, the printer PR receives print data from the portable terminal Te by using the WFDNW (i.e., by using the Wi-Fi communication) (YES in S140). Then, in T160, the printer PR performs printing of an image represented by the print data (S142).

Next, in T170, the printer PR sends a termination request to the portable terminal Te by using the Wi-Fi communication, terminates the wireless connection with the portable terminal Te and therefore causes the portable terminal Te to secede from the WFDNW (S144 of FIG. 3). Thereby, the number of slave apparatuses becomes "3", which is less than the upper limit number "4". Next, in T180, the printer PR sends an Invitation Request signal including the MACd to the portable terminal Td by using the Wi-Fi communication (S146). Then, in T190, the printer PR again establishes the wireless connection with the portable terminal Td by using the Wi-Fi communication, and therefore causes the portable terminal Td to again participate in the WFDNW as a slave apparatus (S146). Thereby, the number of slave apparatuses becomes the upper limit number "4". That is, the state before receiving the connection request from the portable terminal Te is returned to.

As illustrated in case B, in case of receiving a connection request from the portable terminal Te under a state of the number of slave apparatuses being equal to the upper limit number "4" (T110), the printer PR causes the portable terminal Td to secede from the WFDNW (T134), and causes the portable terminal Te to participate in the WFDNW (T140). Consequently, the printer PR can appropriately receive the print data from the portable terminal Te by using the WFDNW (T150). Then, the printer PR causes the portable terminal Te to secede from the WFDNW (T170), and causes the portable terminal Td to again participate in the WFDNW (T180, T190), therefore being able to cause a return to the state before receiving the connection request from the portable terminal Te. Consequently, although not shown, in case of the user of the portable terminal Td desiring to cause the printer PR to again perform a print, the printer PR can receive print data from the portable terminal Td by using the WFDNW, and appropriately perform a print. Thus, in case of receiving a connection request from the portable terminal Te under a state of the number of slave apparatuses being equal to the upper limit number "4", the printer PR can perform a novel and appropriate process.

(Case C; FIG. 7)

An initial state of case C of FIG. 7 is approximately the same as the initial state of case B of FIG. 6. However, the printer PR is receiving print data from all four portable terminals Ta to Td by using the WFDNW. Further, unlike case B of FIG. 6, the MACa, MACb, MACc are registered in the registration list 70 in the memory 34 of the printer PR.

In 210, the printer PR receives a connection request including the MACe from the portable terminal Te by using the NFC communication (S10 of FIG. 2). In T212, the printer PR sends an inquiry notification to the portable terminal Te by using the NFC communication (NO in S20, S22). As a result, in I220, the selection screen is displayed in the portable terminal Te. The process proceeds to case C1 in the case where "Register" is selected in the selection screen, and proceeds to case C2 in the case where "Not Register" is selected in the selection screen.

(Case C1)

In case C1, in 1222 the printer PR receives a registration instruction from the portable terminal Te by using the NFC communication and, in T224, registers the MACe in the registration list 70 in the memory 34 (YES in S24 of FIG. 2, S26).

Next, in 1225, the printer PR determines that the number of slave apparatuses is equal to the upper limit number "4" (NO in S30 of FIG. 2), and selects the termination target portable terminal (i.e., the target terminal) (S110 of FIG. 3). Specifically, the printer PR determines that an inactive communication apparatus is not present among the four slave apparatuses ("0" in S200 of FIG. 4), determines that an unregistered apparatus (i.e., the portable terminal Td) is present among the four slave apparatuses ("One or more" in S230), determines that the MACe of the portable terminal Te, which is the source of the connection request, has been registered in the registration list 70 (YES in S232), and selects the portable terminal Td as the target terminal (S234).

Next, in T230, the printer PR sends the wireless setting information 40 in the memory 34 to the portable terminal Te by using the NFC communication (YES in S120 of FIG. 3, S122). Then, in T232, the printer PR determines that print data is being received from the portable terminal Td (YES in S124), and sends the I/F change notification to the portable terminal Td by using the Wi-Fi communication (8126). Next, in T234, the printer PR sends a termination request to the portable terminal Td by using the Wi-Fi communication, terminates the wireless connection with the portable terminal Td, and therefore causes the portable terminal Td to secede from the WFDNW (S128). Thereby, the number of slave apparatuses becomes "3", which is less than the upper limit number "4".

Although not shown, upon receiving the I/F change notification from the printer PR, the portable terminal Td displays a message prompting the portable terminal Td to be brought closer to the printer PR. Thereby, the user of the portable terminal Td brings the portable terminal Td closer to the printer PR. As a result, an NFC connection between the printer PR and the portable terminal Td is established.

In T236, the printer PR receives uncommunicated data from among the print data from the portable terminal Td by using the NFC communication (S52 of FIG. 2 or S152 of FIG. 3). Then, in T238, the printer PR performs printing of an image represented by the print data (S54 of FIG. 2 or S154 of FIG. 3).

T240 to T290, which are performed next, are the same as T140 to T290 of FIG. 6. As described above, in case C1, in the case where the wireless connection with the portable terminal Td is to be terminated under a state of receiving print data from the portable terminal Td by using the WFDNW, the printer PR sends the I/F change notification to the portable terminal Td by using the Wi-Fi communication (T232). Thereby, the printer PR can appropriately receive the uncommunicated data among the print data from the portable terminal Td by using the NFC communication, and can perform a print (T236, T238).

(Case C2)

In case C2, due to receiving an unnecessary instruction from the portable terminal Te by using the NFC communication in T300, the printer PR does not register the MACe in the registration list 70 in the memory 34 (NO in S24 of FIG. 2). In this case, the printer PR determines that the MACe of the portable terminal Te, which is the source of the connection request, has not been registered in the registration list 70 (NO in S232 of FIG. 4), and does not select a target terminal (S240). Consequently, in T302, the printer PR sends a refusal notification to the portable terminal Te by using the NFC communication (NO in S120 of FIG. 3, S160). Then, in T306, the printer PR receives the print data from the portable terminal Te by using the NFC communication (S162). In T308, the printer PR performs printing of an image represented by the print data (S164).

As described above, in case C2, in the case where the MACe of the portable terminal Te has not been registered in the registration list 70, the printer PR does not select a target terminal. Thereby, termination of the wireless connection with the portable terminal (e.g., Td) identified by the MAC address (e.g., MACd) registered in the registration list 70 can be prevented despite the MACe of the portable terminal Te not being registered in the registration list 70. That is, it is possible to prevent termination of the wireless connection with the portable terminal owned by a user wishing to maintain the wireless connection with the printer PR in spite of the user of the portable terminal Te not wanting to maintain the wireless connection with the printer PR (i.e., despite selecting "Not Register" in the selection screen).

(Correspondence Relationship)

The printer PR and the portable terminals Ta to Te are examples of "wireless communication device" and "external apparatus", respectively. The wireless LAN I/F 20 and the NFC I/F 22 are examples of "first wireless communication interface" and "second wireless communication interface", respectively. The WFDNW is an example of "wireless network". The condition for performing S212, S220, S234 in FIG. 4 is an example of "termination condition". The MAC address of the portable terminal (e.g., Ta) is an example of "identification information".

Case A of FIG. 5 is an example of "a case where a wireless connection request is received from a specific external apparatus under a state of a number of slave apparatuses being less than K". In case A, the portable terminal Ta and the print data of T50 are examples of "specific external apparatus" and "first target data", respectively.

Case B of FIG. 6 and case C of FIG. 7 are examples of "a case where a wireless connection request is received from a specific external apparatus under a state of a number of slave apparatuses being equal to an upper limit number K". In case B and case C, the portable terminal Te (i.e., the source terminal), the MACe, and the portable terminal Td (i.e., the target terminal) are examples of "specific external apparatus", "specific identification information" and "target apparatus", respectively. In case B, the print data of T150 is an example of "first target data". In case C1, the print data of T236 and the print data of T250 are examples of "uncommunicated data among the second target data" and "first target data", respectively. In case C2, the print data of T306 is an example of "first target data".

(Modification 1)

The upper limit number of wireless connections that can be established simultaneously by the printer PR, i.e., the upper limit number of slave apparatuses that can participate in the WFDNW may not be "4", but may be "1" to "3", or may be "5" or more. That is, "K" may be an integer equal to or more than "1".

(Modification 2)

Instead of the NFC I/F 22, the printer PR may comprise an I/F for performing wireless communication in accordance with another communication scheme, such as TransferJet (registered trademark of TransferJet Consortium), BlueTooth (registered trademark of BlueTooth SIG), etc. In this case, the printer PR may receive a connection request via said I/F. In the present modification, said I/F is an example of "second wireless communication interface".

(Modification 3)

Instead of receiving a connection request via the NFC I/F 22, the printer PR may receive a connection request (e.g., a Probe Request signal including an SSID within the wireless setting information 40) via the wireless LAN I/F 20. That is, "wireless communication device" may receive a wireless connection request via a first wireless communication interface. Generally speaking, "wireless communication device" may not comprise a second wireless communication interface.

(Modification 4)

In case of YES in S124 of FIG. 3, the printer PR may not perform S126, wait until the receiving of the print data from the target terminal has been completed, then terminate the wireless connection with the target terminal (S128), and establish the wireless connection with the source terminal (S130). Generally speaking, "wireless communication device" may not execute "notifying the target apparatus of information" and "performing the wireless communication of the uncommunicated data".

(Modification 5)

In case of NO in S120 of FIG. 3, the printer PR may not perform S160 to S164. Generally speaking, "wireless communication device" may not execute "notifying the specific external apparatus of information" and "performing the wireless communication of the first target data via the specific external apparatus via the second wireless communication interface".

(Modification 6)

Instead of registering the MAC address of the portable terminal in the registration list 70 at the timing of S26 of FIG. 2, the printer PR may register the MAC address of the portable terminal at the timing below. For example, the user of the portable terminal may operate the operating unit 12 of the printer PR to input the MAC address of the portable terminal to the printer PR. The printer PR may register the MAC address of the portable terminal at this timing. Moreover, the information to be registered in the registration list 70 need not be the MAC address of the portable terminal, but may be other information for identifying the portable terminal (e.g., a product ID given by the vendor, device name, user name, etc.). That is, "registering" may be any means to register identification information for identifying an external apparatus in a registration list.

(Modification 7)

The printer PR may not comprise the registration list 70. In this case, instead of the selection process of FIG. 4, the printer PR may perform a process for selecting, from among the four slave apparatuses, an inactive communication apparatus as the target terminal in priority basis. That is, "terminating" may not employ logic to select the unregistered apparatus as the target apparatus in priority basis. Further, "wireless communication device" may not execute "registering".

(Modification 8)

Instead of the selection process of FIG. 4, the printer PR may perform a process to select, from among the four slave apparatuses, an unregistered apparatus as the target terminal in priority basis regardless of whether or not communication of print data with the slave apparatuses is being performed. That is, "terminating" may not employ logic to select the inactive communication apparatus as the target apparatus in priority basis.

(Modification 9)

Instead of the selection process of FIG. 4, the printer PR may perform a process to select, from among the four slave apparatuses, a slave apparatus having the oldest connection time as the target terminal. Further, e.g., the printer PR may perform a process to select the target terminal randomly from among the four slave apparatuses. That is, "terminating" may neither employ logic to select the unregistered apparatus as the target apparatus in priority basis, nor employ logic to select the inactive communication apparatus as the target apparatus in priority basis. Further, in the present modification, the situation cannot occur in which "a slave apparatus which satisfies the termination condition is not present". That is, "termination condition" may not be provided.

(Modification 10)

Instead of operating as a G/O apparatus of the WFD scheme and forming the WFDNW, the printer PR may activate a so-called Soft AP, and form a wireless network operating as a pseudo AP. That is, "forming" may include forming a wireless network in which the wireless communication device operates as a master station.

(Modification 11)

"Wireless communication device" is not limited to the printer PR, but may be another type of apparatus (e.g., scanner, FAX, telephone, multi-function peripheral, wireless access point, PC, portable terminal, etc.). Generally speaking, "wireless communication device" may be any type of apparatus as long as it is an apparatus which operates as a master station of a wireless network. For example, in the case where a scanner is employed as "wireless communication device", scan data to be sent from "wireless communication device" to "specific external apparatus" is an example of "target data". Further, "target data" is not limited to print data and scan data, but may be other data such as FAX data, audio data, etc.

(Modification 12)

FIG. 8 shows a flowchart of the upper limit process of the present modification. S5110 to S140, S150 to S154, and S160 to S164 are same as FIG. 3. After the print process of S142 has been completed, in S143A, the CPU 32 determines whether the target apparatus is the registered apparatus. The CPU 32 determines YES in S143A and proceeds to S144 if the target apparatus is the registered apparatus, and determines NO in S143A and ends the processes of FIG. 8 without executing S144 and S146 if the target apparatus is the unregistered apparatus. In the present modification, the terminating of the wireless connection with the source terminal (S144) is executed, in a case where the target apparatus is the registered apparatus (YES in S143A). Accordingly, the printer PR can cause the registered apparatus (i.e. the target apparatus), which frequently uses the printer PR, to participate in the wireless network again. On the other hand, the terminating of the wireless connection with the source terminal (S144) is not executed, in a case where the target apparatus is the unregistered apparatus (NO in S143A). Accordingly, the printer PR can maintain the source apparatus in the wireless network if the target apparatus is the unregistered apparatus which does not frequently use the printer PR.

(Modification 13)

FIG. 9 shows a flowchart of the upper limit process of the present modification. S110 to S140, S150 to S154, and S160 to S164 are same as FIG. 3. After the print process of S142 has been completed, in S143B, the CPU 32 determines whether the target apparatus is the active communication apparatus. The CPU 32 determines YES in S143B and proceeds to S144 if the target apparatus is the active communication apparatus, and determines NO in S143B and ends the processes of FIG. 9 without executing S144 and S146 if the target apparatus is the inactive communication apparatus. In the present modification, the terminating of the wireless connection with the source terminal (S144) is executed, in a case where the target apparatus is the active communication apparatus (YES in S143B). Accordingly, the printer PR can cause the active communication apparatus (i.e. the target apparatus), which has a relatively high possibility for communicating print data with the printer PR, to participate in the wireless network again. On the other hand, the terminating of the wireless connection with the source terminal (S144) is not executed, in a case where the target apparatus is the inactive communication apparatus (NO in S143B). Accordingly, the printer PR can maintain the source apparatus in the wireless network if the target apparatus is the active communication apparatus which has a relatively low possibility for communicating print data with the printer PR.

(Modification 14)

Figure 10:
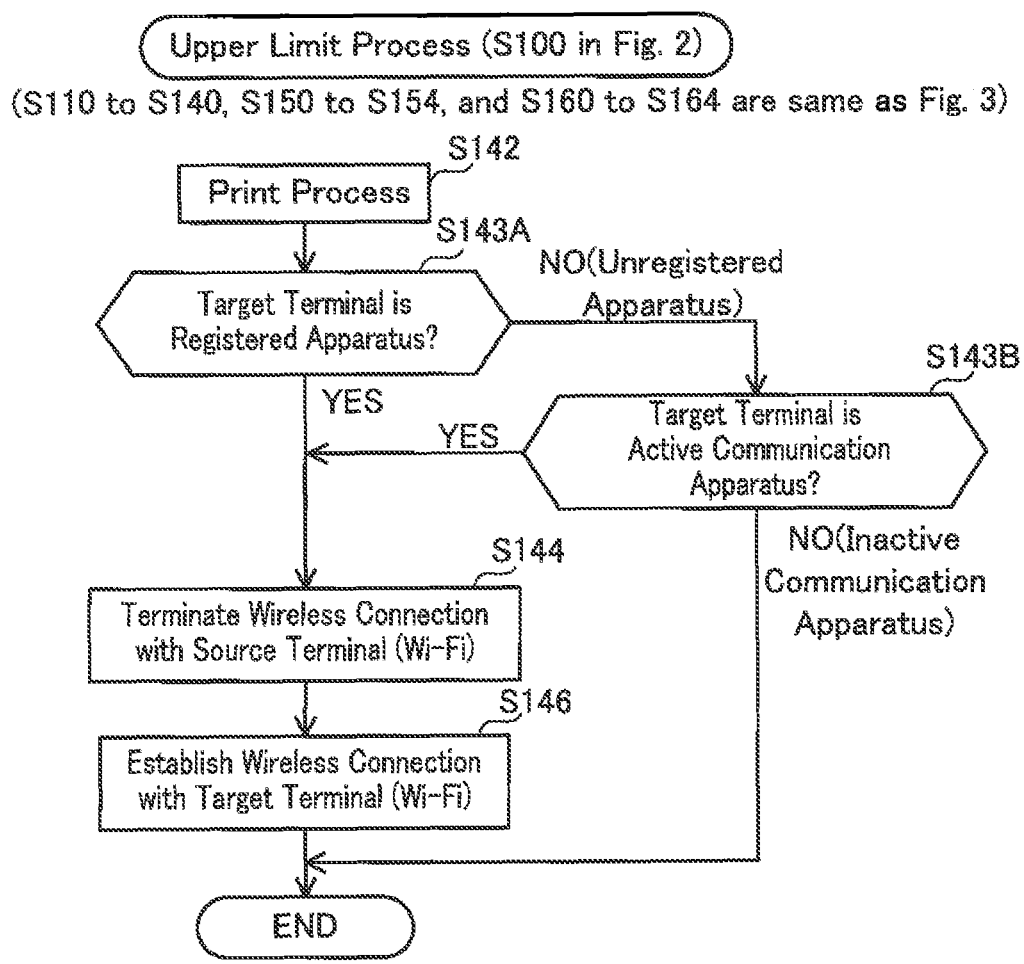
FIG. 10 illustrates a flowchart of a modification 14.

FIG. 10 shows a flowchart of the upper limit process of the present modification. S110 to S140, S150 to S154, and S160 to S164 are same as FIG. 3. The CPU 32 executes S144 and S146 if the target apparatus is the registered apparatus (YES in S143A) or the target apparatus is the active communication apparatus (YES in S143B). On the other hand, the CPU 32 does not execute S144 and S146 if the target apparatus is the unregistered apparatus (NO in S143A) and the target apparatus is the inactive communication apparatus (NO in S143B). Accordingly, the printer PR can maintain the source apparatus in the wireless network if the target apparatus is the unregistered apparatus which does not frequently use the printer PR, and is the active communication apparatus which has a relatively low possibility for communicating print data with the printer PR.

(Modification 15)

In the above embodiments, the processes of FIG. 2 to of FIG. 10 are realized by the CPU 32 of the printer PR performing the program 36 (i.e., software) in the memory 34. Instead, at least one of the processes of FIG. 2 to FIG. 10 may be realized by hardware such as a logic circuit.

The invention claimed is:

1. A wireless communication device comprising:
a first wireless communication interface;
a processor; and
a memory storing computer-readable instructions therein, the computer-readable instructions, when executed by the processor, causing the wireless communication device to execute:
forming a wireless network in which the wireless communication device operates as a master station, the wireless network being for performing a wireless communication of target data with an external apparatus via the first wireless communication interface;
establishing one or more wireless connections with one or more slave apparatuses via the first wireless communication interface, each of the one or more slave apparatuses being an external apparatus operating as a slave station in the wireless network;
receiving a wireless connection request from a specific external apparatus under a state of establishing the one or more wireless connections with the one or more slave apparatuses via the first wireless communication interface;
determining, in a case where the wireless connection request is received from the specific external apparatus, whether a number of the one or more slave apparatuses is equal to an upper limit number K, the upper limit K being an integer equal to or more than 1;
in a case where the number of the one or more slave apparatuses is equal to the upper limit number K:
selecting a target apparatus included in the K slave apparatuses;
disconnecting a wireless connection with the selected target apparatus included in K slave apparatuses by sending a disconnection notification to the target apparatus, so as to cause the target apparatus to secede from the wireless network;
automatically establishing a wireless connection with the specific external apparatus via the first wireless communication interface, so as to cause the specific external apparatus to participate as the slave station in the wireless network, as the target apparatus has seceded from the wireless network;

performing a wireless communication of first target data with the specific external apparatus via the first wireless communication interface by using the wireless network, while the specific external apparatus participates in the wireless network;

automatically disconnecting the wireless connection with the specific external apparatus, so as to cause the specific external apparatus to secede from the wireless network, as the wireless communication of the first target data has been completed; and automatically establishing, via the first wireless communication interface, a wireless connection with the target apparatus which has received the disconnection notification and has seceded from the wireless network, so as to cause the target apparatus to participate as the slave station in the wireless network again instead of the specific external apparatus, as the specific external apparatus has seceded from the wireless network.

2. The wireless communication device as in claim 1, wherein in a case where it is determined that the number of the one or more slave apparatuses is not equal to the upper limit number K, the wireless connection with the target apparatus is maintained, the computer-readable instructions, when executed by the processor, cause the wireless communication device to further execute:

in the case where it is determined that the number of the one or more slave apparatuses is not equal to the upper limit number K, establishing the wireless connection with the specific external apparatus via the first wireless communication interface, so as to cause the specific external apparatus to participate as the slave station in the wireless network; and performing the wireless communication of the first target data with the specific external apparatus via the first wireless communication interface by using the wireless network, after the specific external apparatus has participated in the wireless network, wherein in the case where it is determined that the number of the one or more slave apparatuses is not equal to the upper limit number K, the wireless connection with the specific external apparatus is maintained, after the wireless communication of the first target data has been completed.

3. The wireless communication device as in claim 1, further comprising:

a second wireless communication interface which is different from the first wireless communication interface, wherein a communicable range via the second wireless communication interface is less than a communicable distance via the first wireless communication interface, and the receiving of the wireless connection request from the specific external apparatus is executed via the second wireless communication interface.

4. The wireless communication device as in claim 3, wherein the computer-readable instructions, when executed by the processor, cause the wireless communication device to further execute:

notifying the target apparatus of information via the first wireless communication interface, in a case where the wireless connection with the target apparatus is to be disconnected under a state of performing a wireless communication of second target data with the target apparatus via the first wireless communication interface, the information indicating that a wireless communication of uncommunicated data among the second target data is to be performed via the second wireless communication interface, the uncommunicated data being data which has not been communicated with the target apparatus among the second target data, wherein the disconnecting of the wireless connection with the target apparatus is executed after the notification of the information and the disconnection notification has been sent to the target apparatus, the computer-readable instructions, when executed by the processor, cause the wireless communication device to further execute:

performing the wireless communication of the uncommunicated data with the target apparatus via the second wireless communication interface, after the target apparatus has seceded from the wireless network.

5. The wireless communication device as in claim 3, wherein the disconnecting of the wireless connection with the target apparatus among at least one slave apparatus is executed, in a case where there is the at least one slave apparatus which satisfies a predetermined disconnection condition in the K slave apparatuses, and a wireless connection with any of the K slave apparatuses is not disconnected, in a case where there is no slave apparatus which satisfies the predetermined disconnection condition in the K slave apparatuses, the computer-readable instructions, when executed by the processor, cause the wireless communication device to further execute:

notifying the specific external apparatus of information via the second wireless communication interface, in the case where there is no slave apparatus which satisfies the predetermined condition in the K slave apparatuses, the information indicating that a wireless communication of the first target data is to be performed via the second wireless communication interface; and performing the wireless communication of the first target data with the specific external apparatus via the second wireless communication interface after the notification of the information.

6. The wireless communication device as in claim 1, wherein in a case where the K slave apparatuses include an active communication apparatus and an inactive communication apparatus, the inactive communication apparatus is selected in priority basis as the target apparatus among the K slave apparatuses, wherein the active communication apparatus is an apparatus which is communicating target data with the wireless communication device, and the inactive communication apparatus is an apparatus which is not communicating target data with the wireless communication device.

7. The wireless communication device as in claim 6, wherein the computer-readable instructions, when executed by the processor, cause the wireless communication device to further execute:

registering identification information in a registration list within the memory, the identification information being for identifying an external apparatus with which the wireless communication device is to maintain a wireless connection, wherein in a case where the K slave apparatuses include two or more inactive communication apparatuses and the two or more inactive communication apparatuses include a registered apparatus and an unregistered apparatus, an unregistered apparatus is selected in priority basis as the target apparatus among the two or more inactive communication apparatuses, wherein the registered apparatus is an apparatus being identified by the identification information which is being registered in the registration list, and the unregistered apparatus is an apparatus being identified by identification information which is not being registered in the registration list.

8. The wireless communication device as in claim 6, wherein the computer-readable instructions, when executed by the processor, cause the wireless communication device to further execute:

registering identification information in a registration list within the memory, the identification information being for identifying an external apparatus with which the wireless communication device is to maintain a wireless connection, wherein the wireless connection request includes specific identification information for identifying the specific external apparatus, in a case where the K slave apparatuses do not include the inactive communication apparatus, the K slave apparatuses include an unregistered apparatus, and the specific identification information is being registered in the registration list, the unregistered apparatus is selected in priority basis as the target apparatus among the K slave apparatuses, the unregistered apparatus is an apparatus being identified by identification information which is not being registered in the registration list, and in a case where the K slave apparatuses do not include the inactive communication apparatus, the K slave apparatuses include the unregistered apparatus, and the specific identification information is not being registered in the registration list, a wireless connection with any of the K slave apparatuses is not disconnected.

9. The wireless communication device as in claim 1, wherein the computer-readable instructions, when executed by the processor, cause the wireless communication device to further execute:

registering identification information in a registration list within the memory, the identification information being for identifying an external apparatus with which the wireless communication device is to maintain a wireless connection, wherein in a case where the K slave apparatuses include a registered apparatus and an unregistered apparatus, the unregistered apparatus is selected in priority basis as the target apparatus among the K slave apparatuses, the registered apparatus is an apparatus being identified by the identification information which is being registered in the registration list, and the unregistered apparatus is an apparatus being identified by identification information which is not being registered in the registration list.

10. The wireless communication device as in claim 9, wherein the wireless connection request includes specific identification information for identifying the specific external apparatus, the unregistered apparatus is selected as the target apparatus, in a case where the K slave apparatuses include the unregistered apparatus and the specific identification information is being registered in the registration list, and a wireless connection with any of the K slave apparatuses is not disconnected, in a case where the K slave apparatuses include the unregistered apparatus and the specific identification information is not being registered in the registration list.

11. The wireless communication device as in claim 1, further comprising:

a print performing unit, wherein the wireless communication of the first target data with the specific external apparatus is performed by receiving the first target data from the specific external apparatus, the print performing unit is configured to perform a print based on the first target data, and the wireless connection with the specific external apparatus is automatically disconnected, as the print based on the first target data has been completed.

12. A wireless communication device comprising:

a first wireless communication interface;

a processor; and a memory storing computer-readable instructions therein, the computer-readable instructions, when executed by the processor, causing the wireless communication device to execute:

forming a wireless network in which the wireless communication device operates as a master station, the wireless network being for performing a wireless communication of target data with an external apparatus via the first wireless communication interface;

establishing one or more wireless connections with one or more slave apparatuses via the first wireless communication interface, each of the one or more slave apparatuses being an external apparatus operating as a slave station in the wireless network;

receiving a wireless connection request from a specific external apparatus under a state of establishing the one or more wireless connections with the one or more slave apparatuses via the first wireless communication interface;

determining, in a case where the wireless connection request is received from the specific external apparatus, whether a number of the one or more slave apparatuses is equal to an upper limit number K, the upper limit K being an integer equal to or more than 1;

in a case where the number of the one or more slave apparatuses is equal to the upper limit number K:

selecting a target apparatus included in the K slave apparatuses;

disconnecting a wireless connection with the selected target apparatus included in K slave apparatuses by sending a disconnection notification to the target apparatus, so as to cause the target apparatus to secede from the wireless network, in a case where it is determined that the number of the one or more slave apparatuses is equal to the upper limit number K;

automatically establishing a wireless connection with the specific external apparatus via the first wireless communication interface, so as to cause the specific external apparatus to participate as the slave station in the wireless network, as the target apparatus has seceded from the wireless network, wherein the number of the one or more slave apparatuses becomes again equal to the upper limit number K in a case where the wireless connection with the specific external apparatus is automatically established;

performing a wireless communication of first target data with the specific external apparatus via the first wireless communication interface by using the wireless network, while the specific external apparatus participates in the wireless network;

automatically disconnecting the wireless connection with the specific external apparatus, so as to cause the specific external apparatus to secede from the wireless network, as the wireless communication of the first target data has been completed under a state of the number of the one or more slave apparatuses being equal to the upper limit number K, in a case where the target apparatus is a predetermined apparatus, wherein the wireless connection with the specific external apparatus is maintained after the wireless communication of the first target data has been completed under the state of the number of the one or more slave apparatuses being equal to the upper limit number K, in a case where the target apparatus is not the predetermined apparatus; and automatically establishing, via the first wireless communication interface, a wireless connection with the target apparatus which has received the disconnection notification and has seceded from the wireless network, so as to cause the target apparatus to participate as the slave station in the wireless network again instead of the specific external apparatus, as the specific external apparatus has seceded from the wireless network.

13. The wireless communication device as in claim 12, wherein the computer-readable instructions, when executed by the processor, cause the wireless communication device to further execute:

registering identification information in a registration list within the memory, the identification information being for identifying an external apparatus with which the wireless communication device is to maintain a wireless connection, wherein in a case where the K slave apparatuses include a registered apparatus and an unregistered apparatus, the unregistered apparatus is selected in priority basis as the target apparatus, the registered apparatus is an apparatus being identified by the identification information which is being registered in the registration list, the unregistered apparatus is an apparatus being identified by identification information which is not being registered in the registration list, the disconnecting of the wireless connection with the specific external apparatus is executed after the wireless communication of the first target data has been completed, in a case where the target apparatus is the registered apparatus which is the predetermined apparatus, and the wireless connection with the specific external apparatus is maintained after the wireless communication of the first target data has been completed, in a case where the target apparatus is the unregistered apparatus which is not the predetermined apparatus.

14. The wireless communication device as in claim 13, wherein in a case where the K slave apparatuses include an unregistered active communication apparatus and an unregistered inactive communication apparatus, the unregistered inactive communication apparatus is selected in priority basis as the target apparatus among the K slave apparatuses, wherein the unregistered active communication apparatus is the unregistered apparatus which is communicating target data with the wireless communication device, the unregistered inactive communication apparatus is the unregistered apparatus which is not communicating target data with the wireless communication device, and the disconnecting of the wireless connection with the specific external apparatus is executed after the wireless communication of the first target data has been completed, in a case where the target apparatus is the unregistered active communication apparatus which is the predetermined apparatus, and the wireless connection with the specific external apparatus is maintained after the wireless communication of the first target data has been completed, in a case where the target apparatus is the unregistered inactive communication apparatus which is not the predetermined apparatus.

15. The wireless communication device as in claim 12, wherein in a case where the K slave apparatuses include an active communication apparatus and an inactive communication apparatus, the inactive communication apparatus is selected in priority basis as the target apparatus among the K slave apparatuses, the active communication apparatus is an apparatus which is communicating target data with the wireless communication device, the inactive communication apparatus is an apparatus which is not communicating target data with the wireless communication device, the disconnecting of the wireless connection with the specific external apparatus is executed after the wireless communication of the first target data has been completed, in a case where the target apparatus is the active communication apparatus which is the predetermined apparatus, and the wireless connection with the specific external apparatus is maintained after the wireless communication of the first target data has been completed, in a case where the target apparatus is the inactive communication apparatus which is not the predetermined apparatus.

16. The wireless communication device as in claim 12, further comprising:

a print performing unit, wherein the wireless communication of the first target data with the specific external apparatus is performed by receiving the first target data from the specific external apparatus, the print performing unit is configured to perform a print based on the first target data, and the disconnecting of the wireless connection with the specific external apparatus is executed, after the print based on the first target data has been completed, in the case where the target apparatus is the predetermined apparatus.

17. A non-transitory computer-readable recording medium storing computer-readable instructions for a wireless communication device, the computer-readable instructions, when executed by a processor of the wireless communication device, causing the wireless communication device to execute:

forming a wireless network in which the wireless communication device operates as a master station, the wireless network being for performing a wireless communication of target data with an external apparatus via a first wireless communication interface establishing one or more wireless connections with one or more slave apparatuses via the first wireless communication interface, each of the one or more slave apparatuses being an external apparatus operation as a slave station in the wireless network;

receiving a wireless connection request from a specific external apparatus under a state of establishing the one or more wireless connections with the one or more slave apparatuses via the first wireless communication interface;

determining, in a case where the wireless connection request is received from the specific external apparatus, whether a number of the one or more slave apparatuses is equal to an upper limit number K, the upper limit K being an integer equal to or more than 1;

in a case where the number of the one or more slave apparatuses is equal to the upper limit number K:

selecting a target apparatus included in the K slave apparatuses;

disconnecting a wireless connection with the selected target apparatus included in K slave apparatuses by sending a disconnection notification to the target apparatus, so as to cause the target apparatus to secede from the wireless network, in a case where it is determined that the number of slave apparatuses is equal to the upper limit number K;

automatically establishing a wireless connection with the specific external apparatus via the first wireless communication interface, so as to cause the specific external apparatus to participate as the slave station in the wireless network, as the target apparatus has seceded from the wireless network;

performing a wireless communication of first target data with the specific external apparatus via the first wireless communication interface by using the wireless network, while the specific external apparatus participates in the wireless network;

automatically disconnecting the wireless connection with the specific external apparatus, so as to cause the specific external apparatus to secede from the wireless network, as the wireless communication of the first target data has been completed; and automatically establishing, via the first wireless communication interface, a wireless connection with the target apparatus which has received the disconnection notification and has seceded from the wireless network, so as to cause the target apparatus to participate as the slave station in the wireless network again instead of the specific external apparatus, as the specific external apparatus has seceded from the wireless network.

* * * * *